(12) United States Patent
Yeh et al.

(10) Patent No.: US 10,517,103 B2
(45) Date of Patent: Dec. 24, 2019

(54) METHOD AND WIRELESS NETWORK SYSTEM FOR IMPROVING WIRELESS NETWORK CONNECTION

(71) Applicant: Quanta Computer Inc., Taoyuan (TW)

(72) Inventors: Chih-Tsang Yeh, Taoyuan (TW);
Yang-Sheng Wang, Taoyuan (TW);
Yu-Ching Chen, Taoyuan (TW);
Chin-Hua Hsu, Taoyuan (TW);
Chia-Feng Lin, Taoyuan (TW);
Yu-Ting Ho, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 15/981,025

(22) Filed: May 16, 2018

(65) Prior Publication Data
US 2019/0124666 A1    Apr. 25, 2019

(30) Foreign Application Priority Data

Oct. 24, 2017    (TW) .............................. 106136480 A

(51) Int. Cl.
*H04W 4/00*    (2018.01)
*H04W 72/08*    (2009.01)
(Continued)

(52) U.S. Cl.
CPC ....... *H04W 72/085* (2013.01); *H04L 12/2803* (2013.01); *H04W 84/005* (2013.01); *H04W 84/12* (2013.01)

(58) Field of Classification Search
CPC .. H04W 84/12; H04W 72/085; H04L 12/2803
See application file for complete search history.

(56) References Cited

U.S. PATENT DOCUMENTS 9,668,233 B1 *   5/2017   Horner .................. H04W 64/00
2016/0150376 A1   5/2016   Chiou et al.
(Continued)

FOREIGN PATENT DOCUMENTS

WO        2007/014159 A2    2/2007

OTHER PUBLICATIONS

Chinese language office action dated Jul. 20, 2018, issued in application No. TW 106136480.

*Primary Examiner* — Bo Hui A Zhu
(74) *Attorney, Agent, or Firm* — McClure, Qualey & Rodack, LLP

(57) ABSTRACT

A method for improving wireless network connection is provided. The method is used in a mobile node moving in an area and includes: respectively receiving spatial information broadcasted by a root node and fixed nodes in a plurality of cells constituting the area, wherein each of the fixed nodes is directly connected to the root node, or indirectly connected to the root node through one or more other fixed nodes; obtaining current leakage weight values of the mobile node that is directly connected to the root node and is indirectly connected to the root node through the fixed nodes according to the spatial information received in each of the cells; generating a connection leakage table according to the largest one among the current leakage weight values; and determining a target position of the area which the mobile node moves to according to the connection leakage table.

8 Claims, 9 Drawing Sheets

(51) Int. Cl.
*H04L 12/28* (2006.01)
*H04W 84/12* (2009.01)
*H04W 84/00* (2009.01)

(56) References Cited

U.S. PATENT DOCUMENTS

| | | |
|---|---|---|
| 2016/0216120 A1 | 7/2016 | Rochberger et al. |
| 2018/0041868 A1* | 2/2018 | Gunnarsson .......... G01S 5/0036 |
| 2018/0184330 A1* | 6/2018 | Egner ................... H04L 43/065 |

* cited by examiner

| Cell | Time | Node ID | Traffic Count | Throughput | Signal Strength | Packet Loss | Bandwidth Information |
|---|---|---|---|---|---|---|---|
| #1 | T1 | $ID_{Root}$ | $TC_{Root\_\#1\_T1}$ | $TH_{Root\_\#1\_T1}$ | $S_{Root\_\#1\_T1}$ | $PL_{Root\_\#1\_T1}$ | $BW_{Root\_\#1\_T1}$ |
| | | $ID_A$ | $TC_{A\_\#1\_T1}$ | $TH_{A\_\#1\_T1}$ | $S_{A\_\#1\_T1}$ | $PL_{A\_\#1\_T1}$ | $BW_{A\_\#1\_T1}$ |
| | | $ID_B$ | $TC_{B\_\#1\_T1}$ | $TH_{B\_\#1\_T1}$ | $S_{B\_\#1\_T1}$ | $PL_{B\_\#1\_T1}$ | $BW_{B\_\#1\_T1}$ |
| | | $ID_C$ | $TC_{C\_\#1\_T1}$ | $TH_{C\_\#1\_T1}$ | $S_{C\_\#1\_T1}$ | $PL_{C\_\#1\_T1}$ | $BW_{C\_\#1\_T1}$ |
| | T2 | $ID_{Root}$ | $TC_{Root\_\#1\_T2}$ | $TH_{Root\_\#1\_T2}$ | $S_{Root\_\#1\_T2}$ | $PL_{Root\_\#1\_T2}$ | |
| | | .... | .... | .... | .... | .... | .... |
| #2 | T1 | $ID_{Root}$ | $TC_{Root\_\#2\_T1}$ | $TH_{Root\_\#2\_T1}$ | $S_{Root\_\#2\_T1}$ | $PL_{Root\_\#2\_T1}$ | $BW_{Root\_\#2\_T1}$ |
| | ... | | | | | | |
| ... | | | | | | | |

FIG. 3A

| FIG. 3A | FIG. 3B |

| Leakage weight value | The largest one of leakage weight values |
|---|---|
| $WL_{Root\_\#1\_T1}$ | |
| $WL_{A\_\#1\_T1}$ | $WL_{A\_\#1\_T1}$ |
| $WL_{B\_\#1\_T1}$ | |
| $WL_{C\_\#1\_T1}$ | |
| $WL_{Root\_\#1\_T2}$ | $WL_{Root\_\#1\_T2}$ |
| .... | ... |
| $WL_{Root\_\#2\_T1}$ | ... |
| | |

FIG. 3B

METHOD AND WIRELESS NETWORK SYSTEM FOR IMPROVING WIRELESS NETWORK CONNECTION

CROSS REFERENCE TO RELATED APPLICATIONS

This Application claims priority of Taiwan Patent Application No. 106136480, filed on Oct. 24, 2017. The content of the above applications are incorporated by reference in their entirety.

BACKGROUND OF THE INVENTION

Field of the Invention

Aspects of the present disclosure relate generally to the field of wireless communications networks, and more particularly, to a method and a wireless network system for improving wireless network connection in wireless communications systems.

Description of the Related Art

In recent years, electronic devices which can intelligently control traditional home appliances are sold on the market and can be connected to access points to share Wi-Fi signals. However, when more home appliances are connected to the electronic device at the same time, the wireless network in the area may be overloaded. In addition, Wi-Fi performance typically varies with the distance between a mobile device and an access point supporting Wi-Fi and may be adversely affected by specific obstacles in the home.

Therefore, there is a need for a method and a wireless network system for improving wireless network connection.

BRIEF SUMMARY OF THE INVENTION

The following summary is illustrative only and is not intended to be limiting in any way. That is, the following summary is provided to introduce concepts, highlights, benefits, and advantages of the novel and non-obvious techniques described herein. Select, not all, implementations are described further in the detailed description below. Thus, the following summary is not intended to identify essential features of the claimed subject matter, nor is it intended for use in determining the scope of the claimed subject matter.

A method and a wireless network system for improving wireless network connection in wireless communications systems are provided.

In a preferred embodiment, the disclosure is directed to a method for improving wireless network connection. The method is used in a mobile node moving in an area and comprises: respectively receiving spatial information broadcasted by a root node and a plurality of fixed nodes in a plurality of cells constituting the area, wherein each of the fixed nodes is directly connected to the root node, or indirectly connected to the root node through one or more other fixed nodes; obtaining a plurality of current leakage weight values of the mobile node that is directly connected to the root node and is indirectly connected to the root node through the fixed nodes according to the spatial information received in each of the cells; generating a connection leakage table according to the largest leakage weight value among the plurality of current leakage weight values corresponding to each of the cells; and determining a target position of the area which the mobile node moves to according to the connection leakage table.

In a preferred embodiment, the disclosure is directed to a wireless network system. The wireless network system comprises a root node, a plurality of fixed nodes and a mobile node. Each of the fixed nodes is directly connected to the root node or connected to the root node through one or more fixed nodes. The mobile node moves in a plurality of cells constituting an area and respectively receives spatial information broadcasted by the root node and the plurality of fixed nodes. The mobile node obtains a plurality of current leakage weight values of the mobile node that is directly connected to the root node and is indirectly connected to the root node through one or more other fixed nodes according to the spatial information received in each of the cells. The mobile node generates a connection leakage table according to the largest leakage weight value among the plurality of current leakage weight values obtained by the mobile node in each of the cells. The mobile node determines a target position of the area which the mobile node moves to according to the connection leakage table.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It should be appreciated that the drawings are not necessarily to scale as some components may be shown out of proportion to the size in actual implementation in order to clearly illustrate the concept of the present disclosure.

FIGS. 3A to 3B are a table illustrating the spatial information broadcasted by the root node and the fixed nodes and received by the mobile node at different time points in each cell according to an embodiment of the present disclosure.

DETAILED DESCRIPTION OF THE INVENTION

Figure 1:
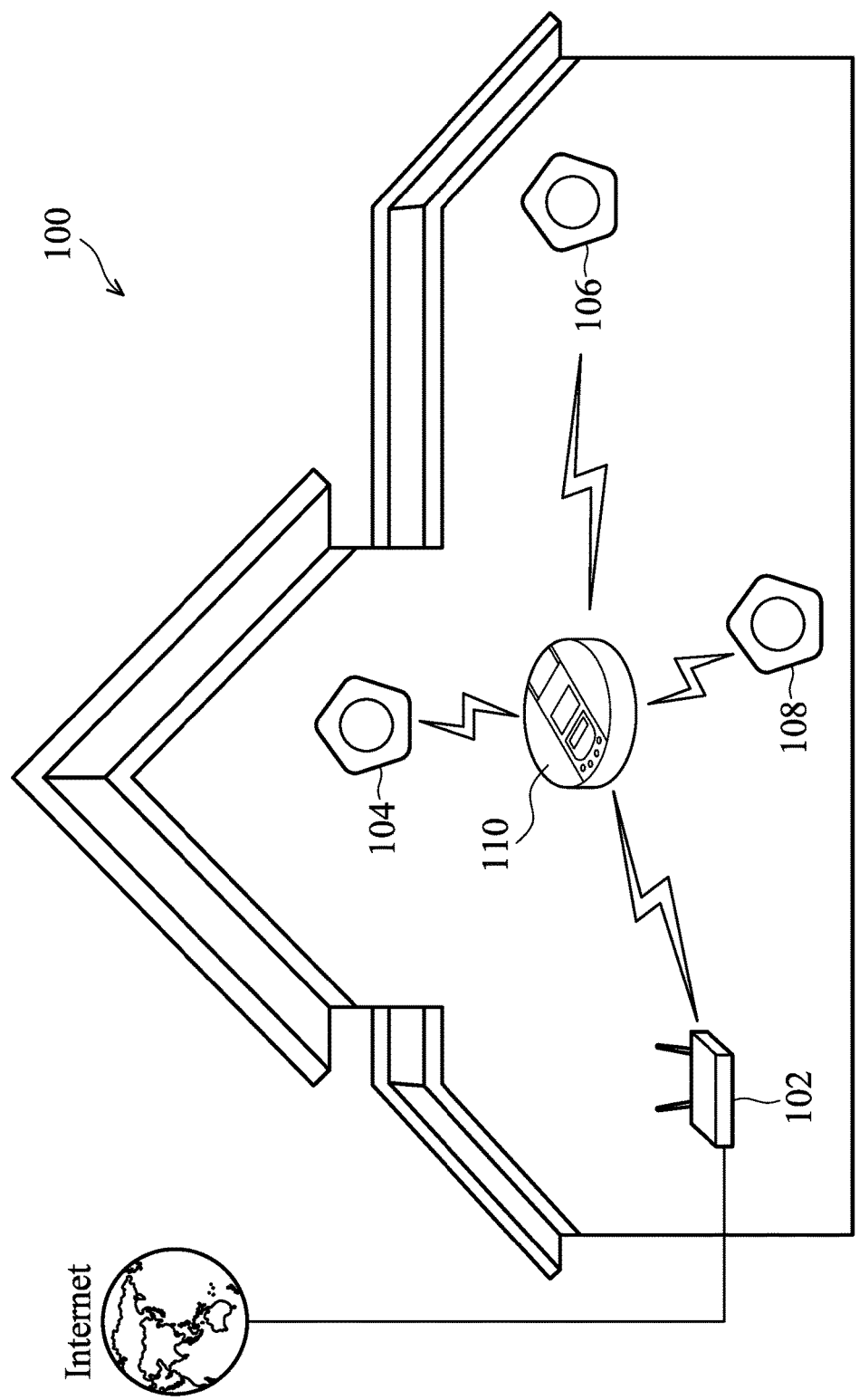
FIG. 1 illustrates a communications network system according to one embodiment of the disclosure.

Several exemplary embodiments of the present disclosure are described with reference to FIGS. 1 through 7, which generally relate to a method for improving wireless network connection and a wireless network device. It should be understood that the following disclosure provides various embodiments as examples for implementing different features of the present disclosure. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

Communications networks can be formed using one or more access points (APs), which can be deployed in homes, apartments, and office buildings. FIG. 1 illustrates a communications network system 100 according to one embodiment of the disclosure. The communications network system 100 may be formed by a root node (also known as a root access point) 102 and a plurality of fixed nodes (a.k.a. fixed access point) 104, 106 or 108. The fixed node 104, 106 or 108 may be directly connected to the root node 102 or be connected to the root node 102 through one or more other fixed nodes.

The root node 102 typically provides a wired connection to a wide area network (WAN) such as the Internet, which may include but is not limited to a wireless router. This enables network access for the fixed nodes 104, 106 and 108 in the nearby vicinity. Within the wireless network provided by the root node 102, the root node 102 functions as a gateway for the connected devices to communicate with other fixed nodes 104, 106 and 108 located remotely on the Internet. In this way the nodes "share" an Internet connection.

The fixed node 104, 106 or 108 may be an electronic device that controls home appliances or shares a wireless network. The fixed node 104, 106, or 108 may communicate with other fixed nodes or the root node by using wireless communication technology standards such as Wi-Fi or Bluetooth.

In FIG. 1, the communications network system 100 further includes a mobile node 110. The mobile node 110 is a communication device that can move in an area, such as but not limited to a household appliance or a robot, for example, a robot cleaner, a care robot, and so on. The mobile node 110 can be used to connect with other nodes for receiving and transmitting various data and parameters via wireless communication capabilities such as Wi-Fi, Bluetooth, and so on. Through these data or parameters, the mobile node 110 can move to a position in the area and determine a node connected to the mobile node 110 to improve the wireless network connection in the area.

The detailed description of how the mobile node improves the wireless network connection in an area will be described below.

Figure 2A:
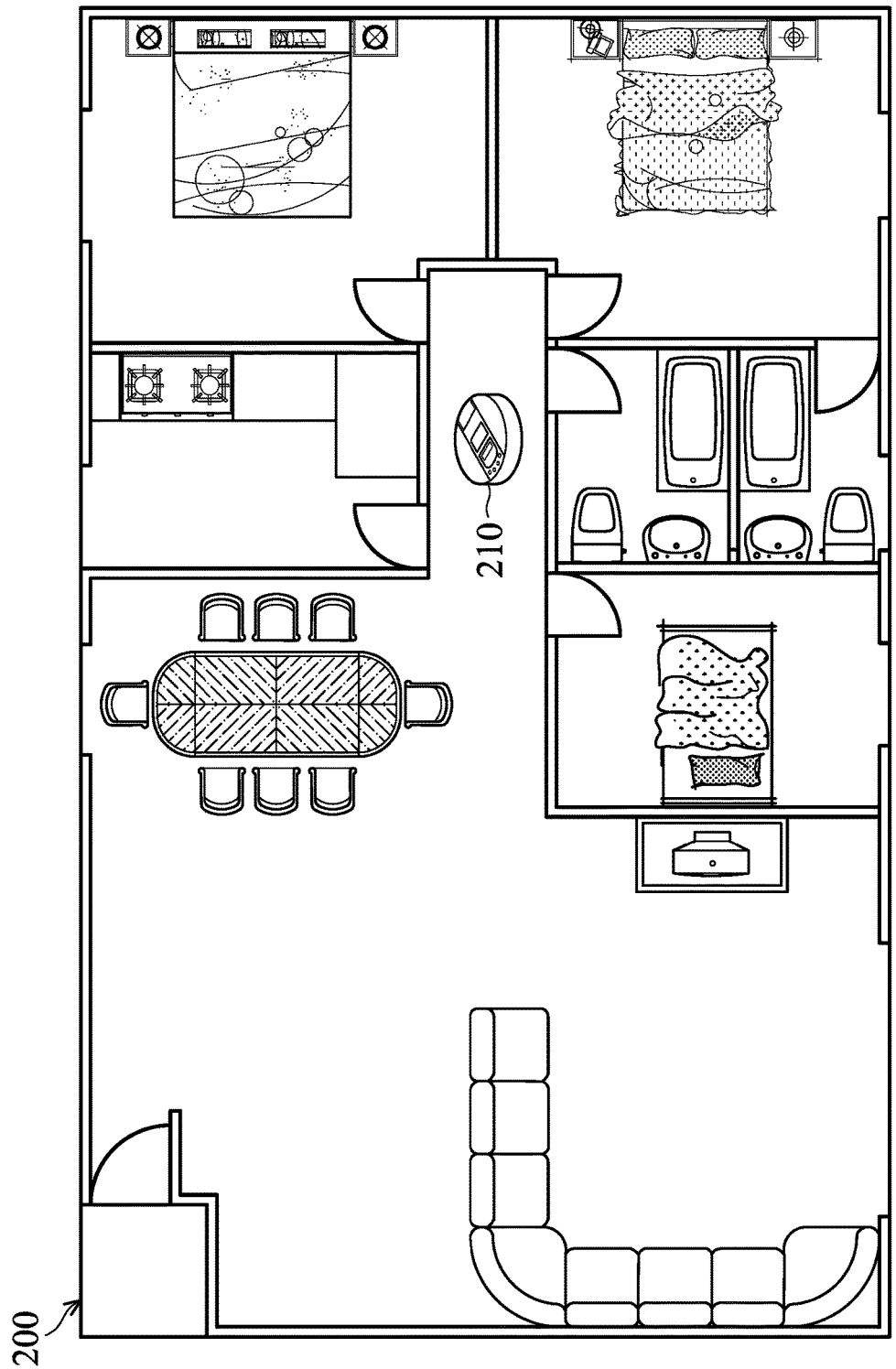
FIGS. 2A-2B are schematic diagrams illustrating that a mobile node moves in an area and detects information broadcasted by nodes according to an embodiment of the present disclosure.
Figure 2B:
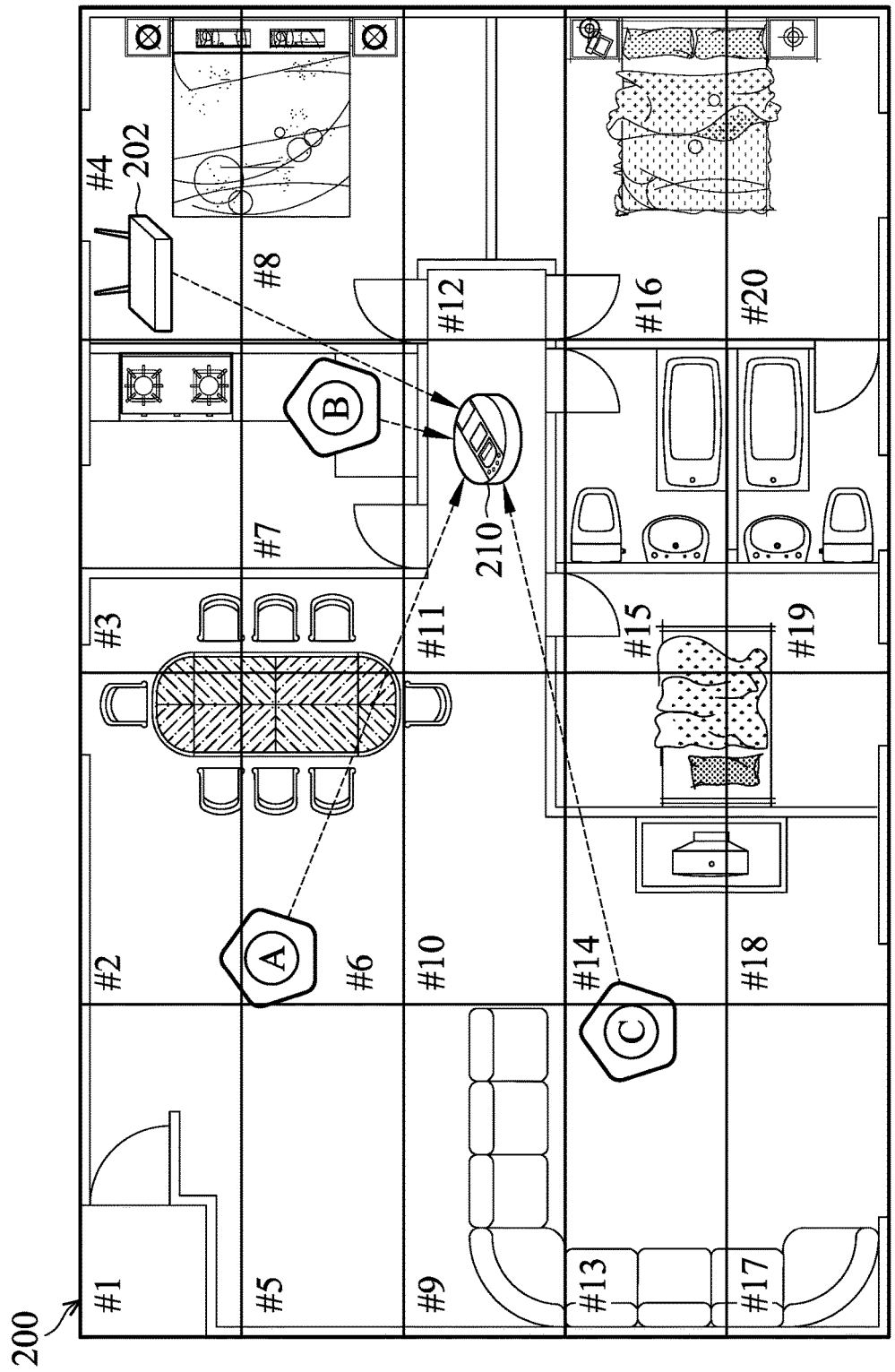
Figure 4:
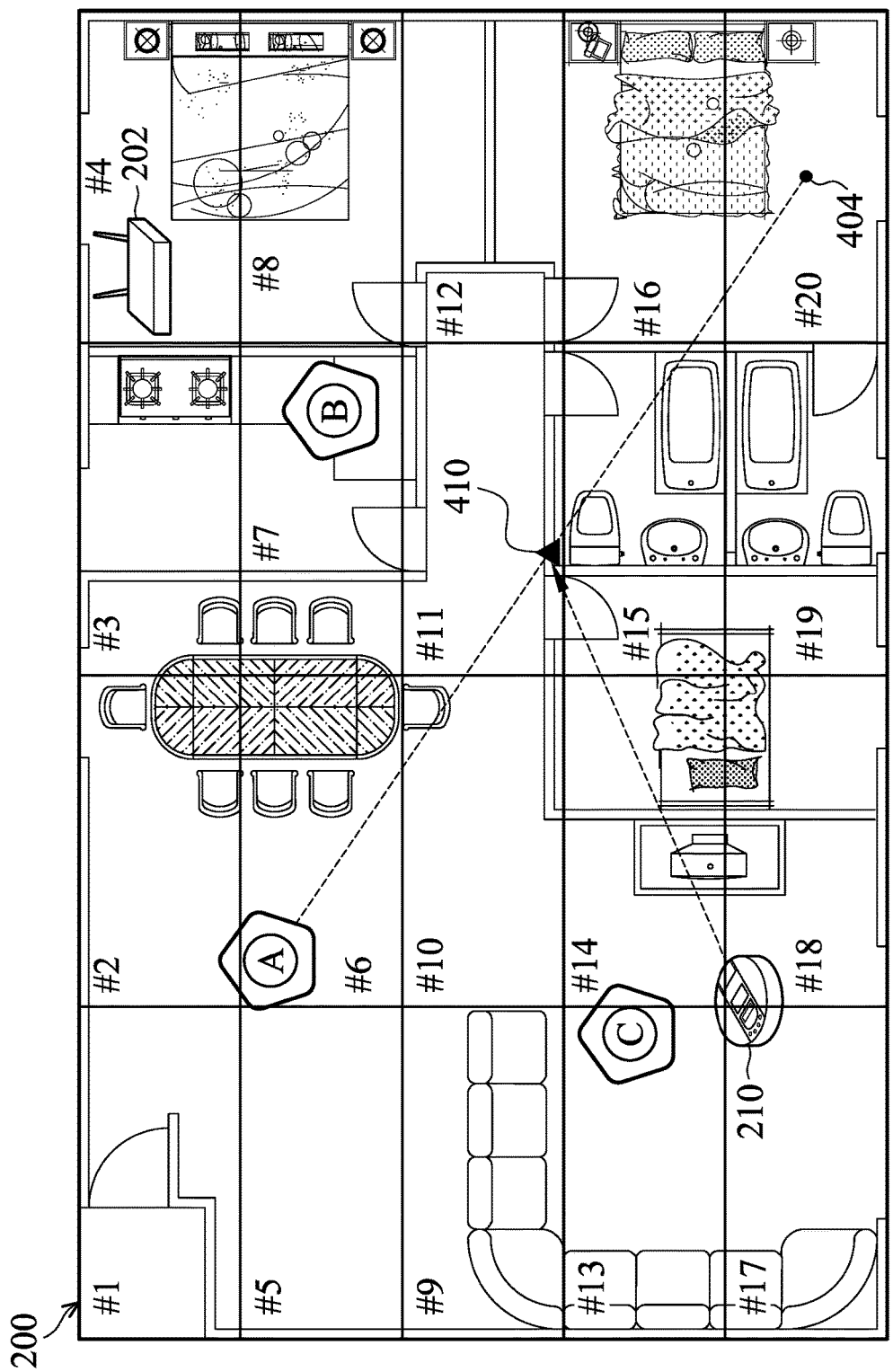
FIG. 4 is a schematic diagram illustrating that the mobile node determines a target position according to an embodiment of the present disclosure.
Figure 5:
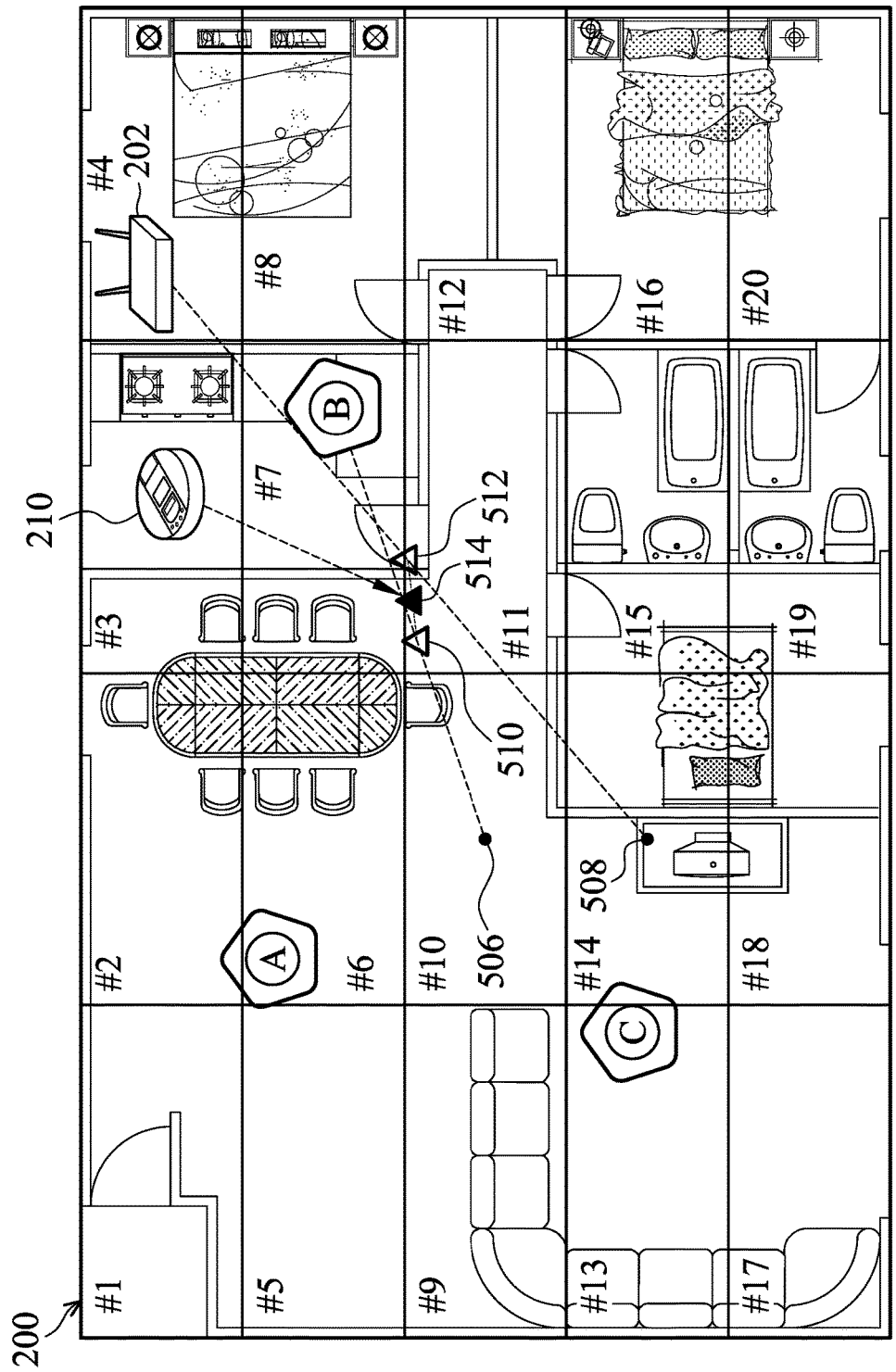
FIG. 5 is a schematic diagram illustrating that the mobile node determines a target position according to an embodiment of the present disclosure.

FIGS. 2A-2B are schematic diagrams illustrating that a mobile node moves in an area and detects information broadcasted by nodes according to an embodiment of the present disclosure. As shown in FIG. 2A, the mobile node 210 moves in the area 200 and performs a simultaneous localization and mapping (SLAM) to obtain a map corresponding to the area 200. As shown in FIG. 2B, the mobile node 210 may divide the area 200 into a plurality of non-overlapping cells #1 to #20 when obtaining the map of the corresponding area 200. It should be noted that although the area 200 in FIG. 2B is equally divided into the cells #1 to #20 with the same size, it should not be limited in the present disclosure. In some embodiments, the area 200 may be divided into non-overlapping and inconsistent cells, and therefore the present disclosure should not be limited to the embodiment shown in FIG. 2B.

Please refer to FIG. 2B. a root node 202 and fixed nodes A to C are installed in the area 200. The mobile node 210 moves in each cell and continues to receive spatial information broadcasted by the root node 202 and the fixed nodes A to C, wherein the spatial information broadcasted by each node (the root node 202 and the fixed nodes A to C) and received by the mobile node 210 in each cell at least comprises: a node identification (ID), a received signal strength indicator (RSSI), a network loading (NL) and a system loading (SL).

The network loading at least comprises bandwidth information, throughput information, packet loss information, and traffic count information. Specifically, the bandwidth information is the maximum amount of data transmission provided by a node. The throughput information is the average amount of data that a node can successfully transmit. The packet loss information is a packet loss rate of data for a node. The traffic count information is the number of other nodes currently connected to a node by using a wireless network shared by the node. The network loading NL can be expressed by the bandwidth information, the throughput information, the packet loss information and the traffic count information as follows:

$$NL = \mu_{BW} \cdot \text{Bandwidth} + \mu_{TH} \cdot \text{Throughput} + \mu_{PL} \cdot \text{PacketLoss} + \mu_{TC} \cdot \text{TracfficCount} \quad (1)$$

wherein $\mu_{BW}$, $\mu_{TH}$, $\mu_{PL}$ and $\mu_{TC}$ are coefficients. Since the units of the bandwidth information, the throughput information, the packet loss information and the traffic count information are not the same, the information may first be mapped to values in the range of 0 to 100, and each node may use the mapped values to obtain the network loading NL. In addition, the network loading NL at this time can also be calculated according to the network loading at the current time point and the network loading at the previous time point.

The system loading SL at least comprises CPU information and memory information of a node, which can be expressed as follows:

$$SL = \delta_{CPU} \cdot CPU + \delta_{MEM} \cdot \text{Memory} \quad (2)$$

wherein $\delta_{CPU}$ and $\delta_{MEM}$ are coefficients. Since the units of the CPU information and the memory information are not the same, the information can be mapped to values in the range of 0 to 100 first, and each node uses the mapped values to obtain the system loading SL. In addition, the system loading SL at this time can be calculated according to the system loading at the current time point and the system loading at the previous time point.

The mobile node 210 may continuously move in the cells #1 to #20 in the area 200 at different time points and records the spatial information broadcasted by each node and received by the mobile node 210 in the cells #1 to #20 at different time points in a table. FIGS. 3A to 3B are a table 300 illustrating the spatial information broadcasted by the root node and the fixed nodes and received by the mobile node at different time points in each cell according to an embodiment of the present disclosure. As shown in the table 300, the second to fifth rows of the table 300 respectively record that the spatial information (Node ID, traffic count, throughput, signal strength, packet loss bandwidth information and so on) broadcasted by the root node 202 ($ID_{Root}$) and the fixed nodes A to C and received by the mobile node 210 in the cells #1 to #20 at the time T1. The sixth row of the table 300 records the spatial information broadcasted by the root node 202 and received by the mobile node 210 when the mobile node 210 is in the cell #1 at the time T2.

Similarly, the eighth row of the table 300 records that the spatial information broadcasted by the root node and received by the mobile node 210 when the mobile node 210 is in the cell #2 at the time T1. It should be noted that although the cells #1 and #2 are used as examples in the table 300 of FIGS. 3A~3B, ellipsis ( . . . ) in FIGS. 3A-3B indicates additional columns not shown in FIGS. 3A~3B such as rows for spatial information received by the mobile node in the cell #20 or columns for leakage weighting (WL) information for each node.

In addition, the mobile node may obtain the current leakage weight values $WL_{current}$ of the mobile node directly connected to the root node and/or indirectly connected to the root node through the fixed nodes A to C according to the spatial information in FIGS. 3A-3B. The leakage weight value $WL_{current}$ is a reference value for determining network quality, wherein the larger the leakage weight value, the better the network quality of the connection between the mobile node and the root node or the fixed node.

When the mobile node or a fixed node is directly connected to the root node, the current leakage weight value $WL_{current}$ can be expressed as follows:

$$WL_{current} = \alpha \cdot SS + \beta \cdot NL + \gamma \cdot SL \quad (3)$$

wherein $\alpha$, $\beta$ and $\gamma$ are values between 0 and 1, and the sum of $\alpha$, $\beta$ and $\gamma$ is 1. Since the units of the signal strength SS, the network loading NL and the system loading SL are not the same, the information may first be mapped to values in the range of 0 to 100, and each node may use the mapped values to obtain the current leakage weight value $WL_{current}$. In one embodiment, the network loading NL and the system loading SL may be preset as 50.

When the mobile node or a fixed node is indirectly connected to the root node through a first fixed node (indirect connection), the current leakage weight value $WL_{current}$ can be expressed as follows:

$$WL_{current} = \alpha \cdot SS + \beta \cdot NL + \gamma \cdot SL \quad (4)$$

$$WL_{current} = \alpha_1 \cdot WL_{Root} + (1 - \alpha_1) \cdot WL_{Node} \quad (5)$$

wherein $WL_{Root}$ is the current leakage weight value of the first fixed node connected to the root node, and $WL_{Node}$ is the current leakage weight value of the mobile node or the fixed node connected to the first fixed node. $\alpha$, $\beta$ and $\gamma$ are values between 0 and 1, and the sum of $\alpha$, $\beta$ and $\gamma$ is 1. $\alpha_1$ is a value between 0 and 1. In the embodiment, $\alpha_1$ is 1/3.

According to the information, the mobile node can obtain the plurality of current leakage weight values that the mobile node is directly connected to the root node and the mobile node is indirectly connected to the root node through the fixed node at each time point in each cell. For example, referring to FIG. 3B, the mobile node 210 may obtain four leakage weight values corresponding to the three fixed nodes A to C and the root node 202, respectively, in the cell #1 at the time T1. Similarly, the mobile node 210 may also obtain four leakage weight values corresponding to the three fixed nodes A to C and the root node 202, respectively, in the cell #1 at the time T2. Correspondingly, the mobile node 210 may further obtain four leakage weight values corresponding to the three fixed nodes A to C and the root node 202, respectively, in the cell #2 at the time T1.

In addition, the largest leakage weight value among the leakage weight values may be selected and recorded in table 300 from the four leakage weight values in each cell at each time. For example, at time T1, the four leakage weight values corresponding to the root node 202 and the three fixed nodes A to C obtained by the mobile node 210 in the cell #1 are $WL_{Root\_\#1\_T1}$, $WL_{A\_\#1\_T1}$, $WL_{B\_\#1\_T1}$ and $WL_{C\_\#1\_T1}$, respectively. When $WL_{A\_\#1\_T1}$ is the largest leakage weight value among the four leakage weight values, $WL_{A\_\#1\_T1}$ is the largest leakage weight value among the leakage weight values obtained by the mobile node 210 in the cell #1 at time T1.

It should be noted that the reason for selecting the largest leakage weight value among the leakage weight values is that the network quality is the best when the mobile node 210 directly or indirectly connected to the node corresponding to the largest leakage weight value among the leakage weight values in the cell. For example, $WL_{A\_\#1\_T1}$ is the largest leakage weight value among the leakage weight values when the mobile node 210 is in the cell #1 at time T1. In other words, at time T1, the network quality is the best when the mobile node 210 is connected to the root node through the fixed node A in the cell #1.

Then, the mobile node may generate a connection leakage table according to the current leakage weight values, wherein the connection leakage table is composed of the largest leakage weight value among the leakage weight values corresponding to each time point and each cell, as shown in Table 1.

TABLE 1

| Time | Cell order (order the leakage weight values (WL) from largest to least) | | | | | |
|---|---|---|---|---|---|---|
| T1 | #6 | #4 | #17 | ... | #5 | #16 | #20 |
|  | $WL_{C\_\#6\_T1}$ | ... | ... | ... | ... | ... | $WL_{C\_\#20\_T1}$ |
| T2 | #12 | #3 | #1 | ... | #5 | #10 | #14 |
|  | $WL_{C\_\#12\_T2}$ | ... | ... | ... | ... | $WL_{B\_\#10\_T2}$ | $WL_{Root\_\#14\_T2}$ |
| . |  |  |  |  |  |  |
| . |  |  |  |  |  |  |

Therefore, it can be clearly determined that the network quality of the cells is good or bad at a specific time point. For example, at time T1, the cell with the worst network quality is cell #20. At time T2, the cell with the worst network quality is cell #14.

In another embodiment, the mobile node may further consider the impact of the historical information on the leakage weight values. The mobile node can obtain the leakage weight value at this time corresponding to each cell according to the largest leakage weight value among the current leakage weight values and the historical information corresponding to the largest leakage weight value. The leakage weight value at this time can be expressed as follows:

$$WL_t = \alpha \cdot WL_{t-1} + (1-\alpha) WL_{current} \quad (6)$$

wherein $WL_t$ is the leakage weight value at this time, $WL_{t-1}$ is the historical information corresponding to the largest leakage weight value (i.e., the last leakage weight value), $WL_{current}$ is the largest leakage weight value among the current leakage weight values, and $\alpha$ is a value between 0 and 1. The mobile node can update the leakage weight value at this time in the connection leakage table.

Next, the mobile node may determine a position in the area 200 according to the connection leakage table. For example, referring to FIG. 4 and Table 1, at time T1, the cell with the worst network quality is the cell #20, wherein the leakage weight value corresponding to the cell #20 is $WL_{A\_\#20\_T1}$. Therefore, the mobile node 210 can obtain the central point 410 between the central position 404 of the cell

20 and the fixed node A as the target position, and moves to the target position so as to enhance the network quality of the cell #20.

In a specific embodiment, the mobile node may also select a plurality of cells with poor network quality to enhance the network quality of these cells. For example, referring to FIG. 5 and Table 1, at time T2, the cell with the worst network quality is the cell #14 corresponding to the leakage weight value $WL_{Root\_\#14\_T2}$, and the cell with the second worst network quality is the cell #10 corresponding to the leakage weight value $WL_{B\_\#10\_T2}$.

Next, the mobile node 210 may calculate a first central position 510 between the central position 506 of the cell #10 and the fixed node B and a second central position 512 between the central position 508 of the cell #14 and the root node 202. Then, the mobile node 210 calculates the central position 514 between the first central position 510 and the second central position 512 as the target position. The mobile node 210 moves to the target position to enhance the network quality of the two cells.

It should be understood that the mobile node may also determine the target position by using other manners, which is not limited to the manner of the disclosure.

Figure 6:
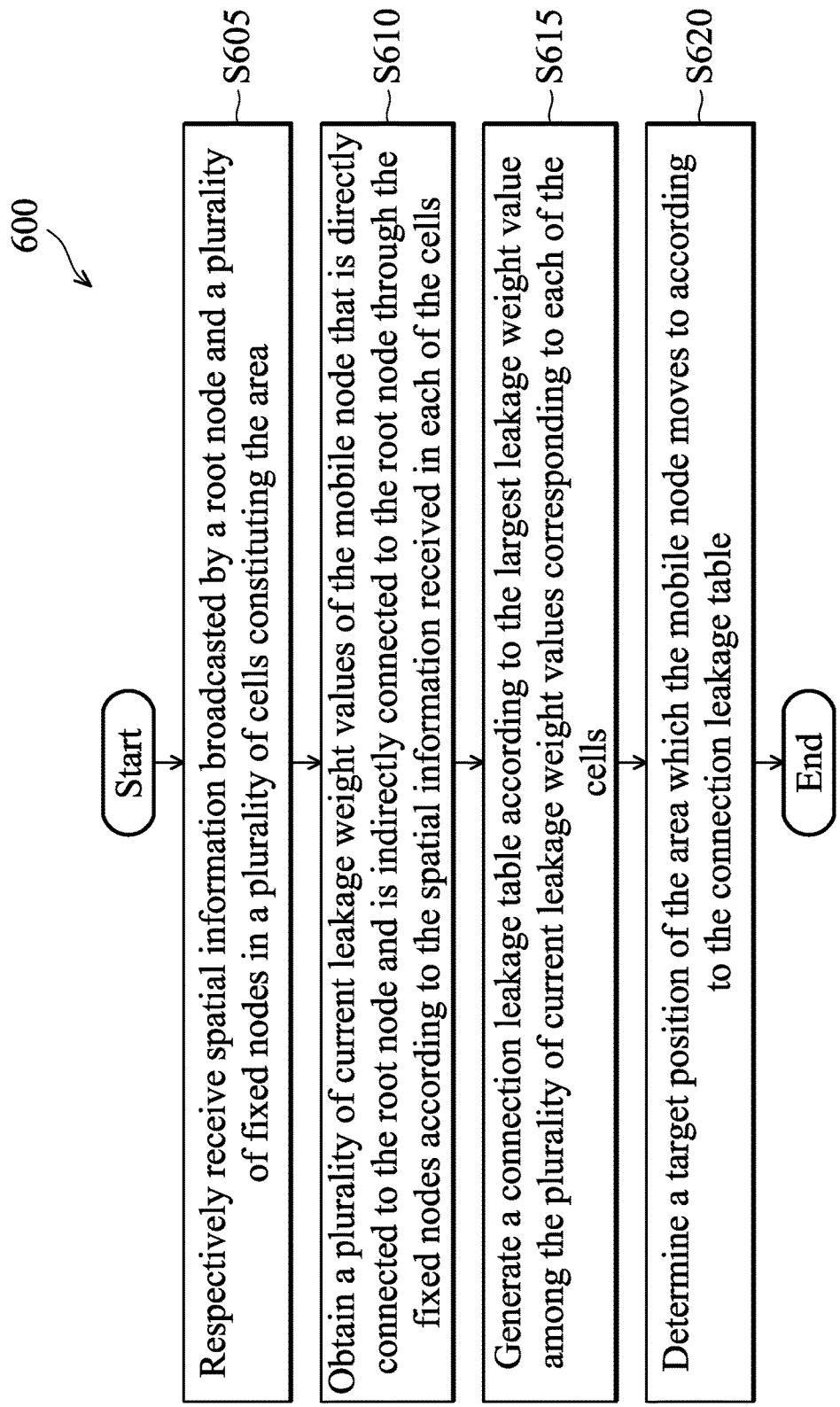
FIG. 6 is a flowchart illustrating a method for improving wireless network connection according to an embodiment of the present disclosure.

FIG. 6 is a flowchart 600 illustrating a method for improving wireless network connection according to an embodiment of the present disclosure. This method is used in a mobile node moving in an area. In step S605, the mobile node respectively receives spatial information broadcasted by a root node and a plurality of fixed nodes in a plurality of cells constituting the area, wherein each of the fixed nodes is directly connected to the root node, or indirectly connected to the root node through one or more other fixed nodes. Next, in step S610, the mobile node obtains a plurality of current leakage weight values of the mobile node that is directly connected to the root node and is indirectly connected to the root node through the fixed nodes according to the spatial information received in each of the cells. Then, in step S615, the mobile node generates a connection leakage table according to the largest leakage weight value among the plurality of current leakage weight values corresponding to each of the cells. In step S620, the mobile node determines a target position of the area which the mobile node moves to according to the connection leakage table.

In step S605 of FIG. 6, the spatial information at least comprises: signal strength, a network loading, and a system loading. The network loading comprises the bandwidth information, the throughput information, the packet loss information and the traffic count information. The system loading comprises the CPU information and the memory information.

In an embodiment, in step S620, the mobile node may further determine whether a trigger condition is satisfied to determine the target position of the mobile node in the area. For example, the trigger condition may be whether the current time is a preset time T6. When the current time is the preset time T6, the mobile node may determine the target position in the area which the mobile node currently moves to according to the cell order corresponding to the time T6 in the connection leakage table in Table 1. As another example, the trigger condition may be whether the current humidity value is a preset humidity value. When the current humidity value is the preset humidity value, the mobile node may obtain the cell order corresponding to the time point in the connection leakage table in Table 1 according to the time point at which the current humidity value is the preset humidity value in the connection leakage table in Table 1 to determine the target position of the area which the mobile node moves to at the time point. It should be understood that the mobile node may also determine the target position through other trigger conditions (for example, manual triggering), and it should not be limited to the trigger conditions in disclosure.

In the following description, a more detailed embodiment will be described to illustrate how the mobile node generates a connection leakage table according to the spatial information.

Figure 7:
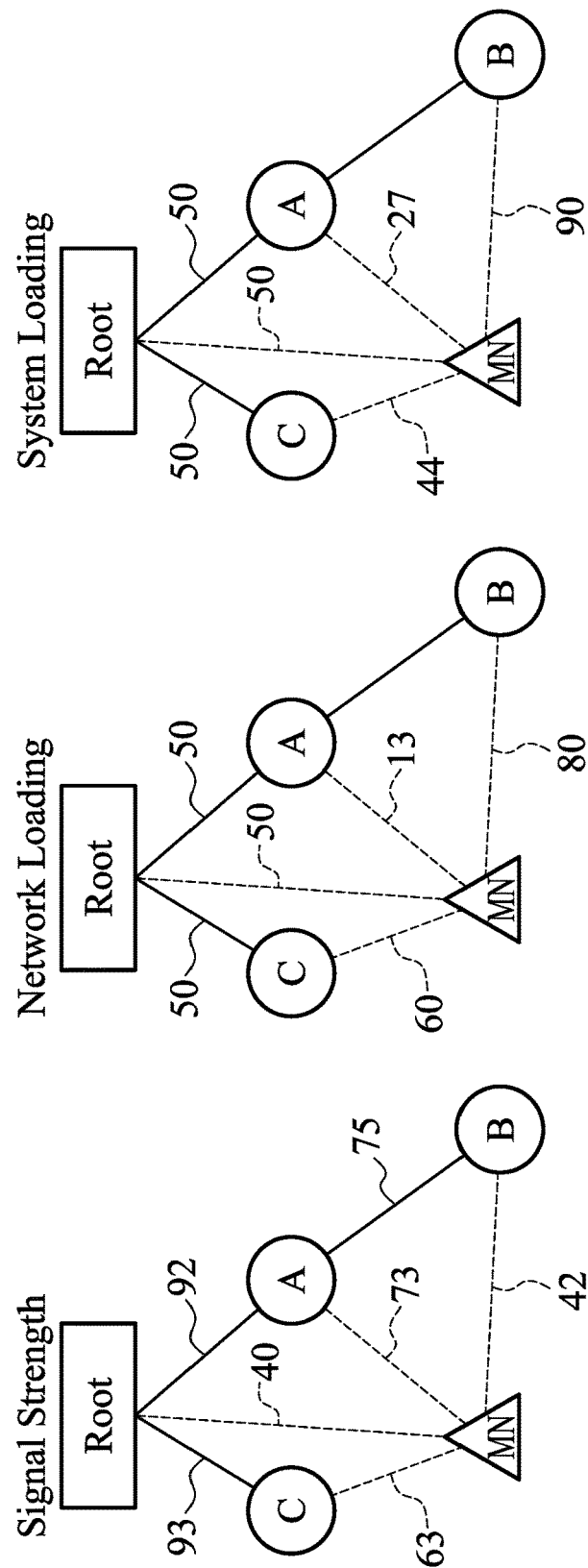
FIG. 7 is a schematic diagram illustrating the spatial information between nodes according to an embodiment of the present disclosure.

FIG. 7 is a schematic diagram illustrating the spatial information between nodes according to an embodiment of the present disclosure. As shown in FIG. 7, the connection relationship between the root node and the fixed nodes A, B and C is represented by solid lines. In the embodiment, it is assumed that the mobile node MN is in the cell #1 at time T1, and the connection relationship between the root node and the fixed nodes A, B and C may be indicated by dotted lines. The values in the figure are the spatial information (the signal strength, the network loading and the system loading) between nodes.

The current leakage weight value $WL_{current}$ between each of the fixed nodes A, B, C and the mobile node MN and the root node or other fixed nodes can be calculated according to the formulas (3), (4) and (5), as shown in FIG. 2. In this example, it is assumed that $\alpha=0.65$, $\beta=0.25$ and $\gamma=0.1$, and $\alpha_1$ is $\frac{1}{3}$.

TABLE 2

| | $WL_{current}$ |
|---|---|
| A → Root | 0.65 × 92 + 0.25 × 50 + 0.1 × 50 = 77.3 |
| C → Root | 0.65 × 93 + 0.25 × 50 + 0.1 × 50 = 77.95 |
| MN → Root | 0.65 × 40 + 0.25 × 50 + 0.1 × 50 = 43.5 |
| B → A | 0.65 × 75 + 0.25 × 13 + 0.1 × 27 = 54.7 |
| MN → A | 0.65 × 73 + 0.25 × 13 + 0.1 × 27 = 53.7 |
| MN → B | 0.65 × 42 + 0.25 × 80 + 0.1 × 90 = 56.3 |
| MN → C | 0.65 × 63 + 0.25 × 60 + 0.1 × 44 = 60.35 |
| B → A → Root | ⅓ × 77.3 + ⅔ × 54.7 = 62.22 |
| MN → A → Root | ⅓ × 77.3 + ⅔ × 53.4 = 61.36 |
| MN → C → Root | ⅓ × 77.95 + ⅔ × 60.35 = 66.21 |
| MN → B → C → Root | ⅓ × 62.22 + ⅔ × 56.3 = 58.27 |

In Table 2, the current leakage weight value calculated by the mobile node MN indirectly connected to the root node through the fixed node C is the maximum value, 66.21. Therefore, the largest leakage weight value among the current leakage weight values of the mobile node MN in the cell #1 at time T1 is 66.21 and is recorded in the connection leakage table. In an embodiment, the mobile node MN may further refer to the formula (6) to take the historical information into account. It is assumed that $\alpha=0.8$ and the previous leakage weight value $WL_{t-1}$ is 67.63, the leakage weight value at this time $WL_t$ can be expressed as follows:

$$WL_t = 0.8 \cdot 67.63 + 0.2 \cdot 66.21 = 67.34$$

Similarly, according to the formula, the mobile node MN can obtain the largest leakage weight value among the current leakage weight values of each cell at each time point to generate the connection leakage table, as shown in Table 1. In addition, it should be noted that each fixed node may first calculate the current leakage weight value of the node connected to the each fixed node, and then may broadcast the current leakage weight value instead of the space information. For example, the fixed node A may directly broadcast the current leakage weight value 77.3 of the fixed node A connected to the root node instead of the space information (the signal strength 92, the network loading 50 and the system loading 50).

Therefore, the mobile node can move to different target positions at different time points in an area through the method for improving the wireless network connection proposed in the present disclosure, so as to dynamically improve the quality of the wireless network connection in the area.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using another structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those with skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those with skill in the art will further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It should be understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for improving wireless network connection, used in a mobile node moving in an area, comprising:
respectively receiving spatial information broadcasted by a root node and a plurality of fixed nodes in a plurality of cells constituting the area, wherein each of the fixed nodes is directly connected to the root node, or indirectly connected to the root node through one or more other fixed nodes;
obtaining a plurality of current leakage weight values of the mobile node that is directly connected to the root node and is indirectly connected to the root node through the fixed nodes according to the spatial information received in each of the cells;
generating a connection leakage table according to the largest leakage weight value among the plurality of current leakage weight values corresponding to each of the cells; and
determining a target position of the area which the mobile node moves to according to the connection leakage table,
wherein the spatial information broadcasted by the root node and the plurality of fixed nodes at least comprises:
signal strength;
a network loading, wherein the network loading comprises bandwidth information, throughput information, packet loss information, and traffic count information; and a system loading, wherein the system loading comprises CPU information and memory information.

2. The method for improving wireless network connection as claimed in claim 1, wherein the step of generating the connection leakage table according to the largest leakage weight value among the plurality of current leakage weight values corresponding to each of the cells further comprises:
obtaining a leakage weight value at this time corresponding to each of the cells according to the largest leakage weight value among the current leakage weight values and historical information corresponding to the largest leakage weight value;
wherein the leakage weight value at this time corresponding to each of the cells is expressed as follows:

$$WL_t = \alpha \cdot WL_{t-1} + (1-\alpha) WL_{current}$$

wherein $WL_t$ is the leakage weight value at this time, $WL_{t-1}$ is the historical information corresponding to the largest leakage weight value, $WL_{current}$ is the largest leakage weight value among the current leakage weight values, and $\alpha$ is a coefficient.

3. The method for improving wireless network connection as claimed in claim 1, wherein when the mobile node is directly connected to the root node, the current leakage weight value is expressed as follows:

$$WL_{current} = \alpha \cdot SS + \beta \cdot NL + \gamma \cdot SL$$

wherein $WL_{current}$ is the current leakage weight value, SS is the signal strength of the root node, NL is the network loading of the root node, SL is the system loading of the root node, and the sum of $\alpha$, $\delta$ and $\gamma$ is 1; and
wherein when the mobile node is indirectly connected to the root node through a first fixed node, the current leakage weight value is expressed as follows:

$$WL_{Node} = \alpha \cdot SS + \beta \cdot NL + \gamma \cdot SL$$

$$WL_{current} = \alpha_1 \cdot WL_{Root} + (1-\alpha_1) \cdot WL_{Node}$$

wherein $WL_{current}$ is the current leakage weight value, $WL_{Root}$ is the leakage weight value of the first fixed node connected to the root node at this time, and $WL_{node}$ is the current leakage weight value of the mobile node connected to the first fixed node, and the sum of $\alpha$, $\beta$ and $\gamma$ is 1, $\alpha_1$ is a value between 0 and 1.

4. The method for improving wireless network connection as claimed in claim 1, wherein the step of determining the target position of the area which the mobile node moves to according to the connection leakage table further comprises:
obtaining at least one cell and at least one first node corresponding to the at least one leakage weight value according to the at least one leakage weight value in the connection leakage table and obtaining the target position according to at least one first central point between the cell and the first node.

5. A wireless network system, comprising:
a root node;
a plurality of fixed nodes, wherein each of the fixed nodes is directly connected to the root node or connected to the root node through one or more fixed nodes; and
a mobile node, moving in a plurality of cells constituting an area and respectively receiving spatial information broadcasted by the root node and the plurality of fixed nodes; obtaining a plurality of current leakage weight values of the mobile node that is directly connected to the root node and is indirectly connected to the root node through one or more other fixed nodes according to the spatial information received in each of the cells; generating a connection leakage table according to the largest leakage weight value among the plurality of current leakage weight values obtained by the mobile node in each of the cells; and determining a target position of the area which the mobile node moves to according to the connection leakage table,
wherein the spatial information broadcasted by the root node and the plurality of fixed nodes at least comprises:
signal strength;
a network loading, wherein the network loading comprises bandwidth information, throughput information, packet loss information and traffic count information; and
a system loading, wherein the system loading comprises CPU information and memory information.

6. The wireless network system as claimed in claim 5, wherein the mobile node generating the connection leakage table according to the largest leakage weight value among the plurality of current leakage weight values in each of the cells further executes:
obtaining a leakage weight value at this time corresponding to each of the cells according to the largest leakage weight value among the current leakage weight values and historical information corresponding to the largest leakage weight value;
wherein the leakage weight value at this time corresponding to each of the cells is expressed as follows:

$$WL_t = \alpha \cdot WL_{t-1} + (1-\alpha) WL_{current}$$

wherein $WL_t$ is the leakage weight value at this time, $WL_{t-1}$ is the historical information corresponding to the largest leakage weight value, $WL_{current}$ is the largest leakage weight value among the current leakage weight values, and a is a coefficient.

7. The wireless network system as claimed in claim 5, wherein when the mobile node is directly connected to the root node, the current leakage weight value is expressed as follows:

$$WL_{current} = \alpha \cdot SS + \beta \cdot NL + \gamma \cdot SL$$

wherein $WL_{current}$ is the current leakage weight value, SS is the signal strength of the root node, NL is the network loading of the root node, SL is the system loading of the root node, and the sum of $\alpha$, $\beta$ and $\gamma$ is 1; and
wherein when the mobile node is indirectly connected to the root node through a first fixed node, the current leakage weight value is expressed as follows:

$$WL_{node} = \alpha \cdot SS + \beta \cdot NL + \gamma \cdot SL$$

$$WL_{current} = \alpha_1 \cdot WL_{Root} + (1-\alpha_1) \cdot WL_{Node}$$

wherein $WL_{current}$ is the current leakage weight value, $WL_{Root}$ is the leakage weight value of the first fixed node connected to the root node at this time, and $WL_{node}$ is the current leakage weight value of the mobile node connected to the first fixed node, and the sum of $\alpha$, $\beta$ and $\gamma$ is 1, $\alpha_1$ is a value between 0 and 1.

8. The wireless network system as claimed in claim 5, wherein the mobile node determining the target position of the area which the mobile node moves to according to the connection leakage table further executes:
obtaining at least one cell and at least one first node corresponding to the at least one leakage weight value according to the at least one leakage weight value in the connection leakage table and obtaining the target position according to at least one first central point between the cell and the first node.

\* \* \* \* \*